US012215896B2

(12) United States Patent
Kaeser et al.

(10) Patent No.: US 12,215,896 B2
(45) Date of Patent: Feb. 4, 2025

(54) SYSTEM AND A METHOD FOR NOTIFYING A USER TO REPLACE A SACRIFICIAL ANODE

(71) Applicant: Pentair, Inc., Minneapolis, MN (US)

(72) Inventors: Todd James Kaeser, Largo, FL (US); Zachary Steven Pickard, Carrboro, NC (US)

(73) Assignee: Pentair, Inc., Minneapolis, MN (US)

( * ) Notice: Subject to any disclaimer, the term of this patent is extended or adjusted under 35 U.S.C. 154(b) by 78 days.

(21) Appl. No.: 18/147,694

(22) Filed: Dec. 28, 2022

(65) Prior Publication Data

US 2023/0213241 A1 Jul. 6, 2023

Related U.S. Application Data

(60) Provisional application No. 63/266,223, filed on Dec. 30, 2021.

(51) Int. Cl.
*F24H 9/45* (2022.01)
*C23F 13/00* (2006.01)
(Continued)

(52) U.S. Cl.
CPC .......... *F24H 9/455* (2022.01); *C23F 13/005* (2013.01); *F24H 9/45* (2022.01); *G08B 21/24* (2013.01); *E04H 4/129* (2013.01); *F24H 15/296* (2022.01)

(58) Field of Classification Search
CPC .. F03B 13/00; F24H 9/45; F24H 9/455; C02F 1/00; C02F 1/008; C02F 1/4674;
(Continued)

(56) References Cited

U.S. PATENT DOCUMENTS

| | | | | |
|---|---|---|---|---|
| 10,041,177 B2 * | 8/2018 | Nourbakhsh | ........... | F03B 13/00 |
| 2005/0137118 A1 * | 6/2005 | Silveri | .................... | C02F 1/008 510/514 |

(Continued)

FOREIGN PATENT DOCUMENTS

| | | | |
|---|---|---|---|
| CN | 101852495 | A | 10/2010 |
| GB | 2458141 | A | 9/2009 |
| WO | 2018132017 | A1 | 7/2018 |

OTHER PUBLICATIONS

NPL Search (May 11, 2024).*
Extended European Search Report, Patent Application No. 22217281.9, Dated Jul. 7, 2023, 10 pages.

*Primary Examiner* — Van T Trieu
(74) *Attorney, Agent, or Firm* — Husch Blackwell LLP

(57) ABSTRACT

A device, system, and a method are provided for notifying a user to replace a sacrificial anode in a pool or spa system. The device is provided in the form of a body defining a cavity, a sacrificial anode, and a sensor. The sacrificial anode substantially surrounds the cavity when the sacrificial anode is coupled to the body. The sensor is at least partially received into the cavity and is in communication with a pool automation system. The sensor is designed to transmit a signal to the pool automation system when the sensor detects water within the cavity. The signal is processed by the pool automation system, and the pool automation system may then transmit a notification to a user that the sacrificial anode is depleted.

20 Claims, 7 Drawing Sheets

(51) Int. Cl.
*G08B 21/24* (2006.01)
*E04H 4/12* (2006.01)
*F24H 15/296* (2022.01)

(58) Field of Classification Search
CPC .......... C02F 1/50; C23F 13/00; C23F 13/005; C23F 13/10
See application file for complete search history.

(56) References Cited

U.S. PATENT DOCUMENTS

| | | | | |
|---|---|---|---|---|
| 2017/0228999 | A1* | 8/2017 | Joyer | A61H 35/02 |
| 2019/0201045 | A1* | 7/2019 | Yates | A61B 1/0661 |
| 2021/0096098 | A1* | 4/2021 | Scaboo | C12M 41/48 |
| 2021/0356385 | A1 | 10/2021 | Shah et al. | |

* cited by examiner

SYSTEM AND A METHOD FOR NOTIFYING A USER TO REPLACE A SACRIFICIAL ANODE

CROSS-REFERENCE TO RELATED APPLICATIONS

This Application claims priority to U.S. Provisional Patent Application Ser. No. 63/266,223, filed on Dec. 30, 2021, entitled "SYSTEM AND A METHOD FOR NOTIFYING A USER TO REPLACE A SACRIFICIAL ANODE," currently, the entire disclosure of which is incorporated herein by reference.

FIELD OF INVENTION

The present disclosure relates to a device for pools and spas having a sacrificial anode. More particularly, the embodiments of the present disclosure relate to a system and a method for notifying a user to replace a sacrificial anode of a device.

BACKGROUND

Consumers and businesses often use equipment including pumps, filters, and heaters to help them maintain the usability of their pools and spas. Such equipment typically includes components that are immersed or in contact with the pool or spa water for extended periods of time. As such, the components are consistently exposed to chemicals that, over time, can wear down or corrode the components. In turn, this can shorten the equipment's lifetime.

To address this issue, one or more devices in swimming pool systems can be equipped with a sacrificial anode. In particular, the sacrificial anode may help extend a service life of a heat exchanger of a heater, which is traditionally composed of a copper metal or a cupro-nickel alloy. The sacrificial anode is made of at least one highly active metal (e.g., zinc) that may help prevent a less active metal (e.g., copper) from corroding. As time passes, the active material of the sacrificial anode is consumed, corroded, or worn away in place of the metal it is protecting.

Unfortunately, when the sacrificial anode is depleted, the functionality of the sacrificial anode may be partially or fully compromised. When the sacrificial anode is depleted, the sacrificial anode is no longer able to protect the equipment of the pool or spa, thereby leaving the equipment vulnerable to corrosion.

There are many reasons why the consumer may not replace a sacrificial anode once it is worn away, including the consumer's inattention and the consumer's lack of understanding of the sacrificial anode's function. Further, the consumer may not realize that the sacrificial anode has been depleted, meaning that days, weeks, or months may have elapsed during which time the sacrificial anode was not protecting the equipment of the pool or spa. Moreover, there is currently no way to alert a user that a sacrificial anode needs replaced without requiring that the user visibly inspect the anode.

SUMMARY

In one aspect, a device for notifying a user to replace a sacrificial anode is provided. The device is provided in the form of a cavity, a sacrificial anode surrounding the cavity, and a sensor positioned at least partially inside the cavity. The sensor is connected to a pool automation system to transmit a signal for replacing the sacrificial anode when the sensor detects pool water inside the cavity. As a result, the detector senses the water inside the cavity when the sacrificial anode is worn away.

In another aspect, a method for notifying a user to replace a sacrificial anode is also provided. The method comprises the step of sensing pool water inside a cavity of a device. The water is detected inside the cavity by a sensor of the device and the sensor is at least partially disposed within the cavity of the device. Further, the sensor detects the water of the swimming pool inside the cavity when the sacrificial anode of the device is worn away. The method also comprises the step of transmitting a signal to a pool automation system for replacing the sacrificial anode when the sensor senses the water of the swimming pool inside the cavity.

In yet another aspect, a system for notifying a user to replace a sacrificial anode is provided. The system comprises a device and a pool automation system in communication with the device. The device comprises a cavity, a sacrificial anode surrounding the cavity, and a sensor inside the cavity. Further, the sensor is connected to a pool automation system to transmit a signal for replacing the sacrificial anode when the sensor senses pool water inside the cavity. Moreover, the pool automation system comprises a receiver configured to receive the signal from the sensor for replacing the sacrificial anode, and a transmitter configured to transmit a notification to user equipment for replacing the sacrificial anode after receiving the signal from the sensor.

In some embodiments, the sensor comprises a first portion and a second portion, wherein the first portion and the second portion are positioned parallel to each other. In other embodiments, the first portion and the second portion are separated by a gap. In yet other embodiments the first portion and the second portion comprise an electrode pair.

In some embodiments, the sensor detects the water of the swimming pool inside the cavity when the gap between a first portion and a second portion of the sensor is at least partially filled with water.

In other embodiments, the pool automation system transmits a notification to the user equipment to replace the sacrificial anode after receiving the signal from the sensor.

In some embodiments, the pool automation system sets one or more functions of the pool automation system into a lockout mode until the sacrificial anode is replaced.

In other embodiments, the lockout mode is associated with a mode for the pool automation system that disables the one or more functions of the pool automation system until the sacrificial anode is replaced. In some embodiments, the one or more functions of the pool automation system comprise heating the water inside the swimming pool by a heater.

In other embodiments, a service light on a control panel of the heater is illuminated to notify a user that the heater is temporarily disabled by the pool automation system.

In some embodiments, the signal from the sensor is used by the pool automation system to proactively determine a time for the next replacement of the sacrificial anode.

In other embodiments, the pool automation system transmits a notification to one or more pieces of user equipment to indicate that the sacrificial anode should be replaced.

In yet other embodiments, the signal from the sensor is used by the pool automation system to proactively determine the estimated total lifetime, remaining lifetime, and/or the wear rate of the sacrificial anode.

In some embodiments, the pool automation system transmits a link to the user equipment to purchase a new sacrificial anode.

In other embodiments, the signal from the sensor is used by the pool automation system to determine a wear rate of the sacrificial anode based on one or more of an elapsed time, a flow rate, or one or more water chemistry parameters of the water of the swimming pool.

DETAILED DESCRIPTION

Figure 1:
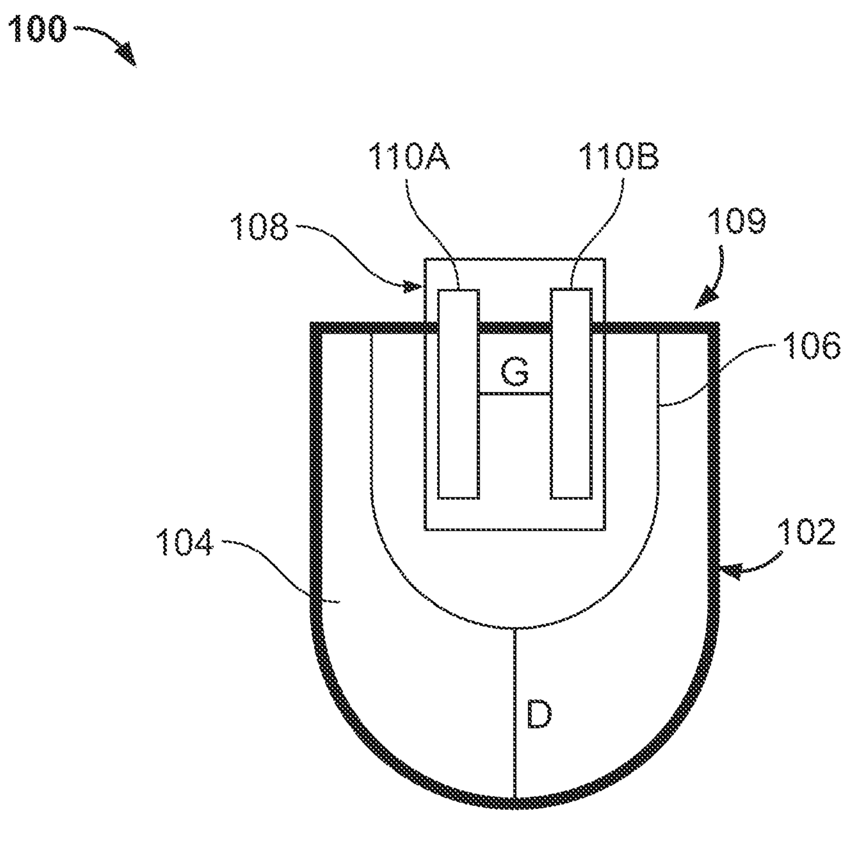
FIG. 1 is a schematic side cross-sectional view of a device including a sacrificial anode.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

According to the teachings herein, a device including a sacrificial anode is provided. The device is designed to protect at least one component of a pool system or a spa system from corrosion or deterioration. The device is also designed to provide a notification to a user when the sacrificial anode is depleted. The device including the sacrificial anode may be coupled to any pool device or spa device, including filters, pumps, fluid conduits, robotic cleaners, and heaters. Preferably, the device including the sacrificial anode is in fluid communication with a heat exchanger of a heater such that the heat exchanger is protected from corrosion.

Referring now to FIG. 1, a device 100 provided in the form of a body 102, a sacrificial anode 104, a cavity 106, and a sensor 108 at least partially disposed within the cavity 106 is shown. As stated above, the device 100 is designed to protect a component of a pool system or a spa system from corrosion and may provide a notification to a user whenever the sacrificial anode 104 is depleted.

The body 102 of the sacrificial anode may be provided in the form of a three-dimensional U-shaped structure including a substantially flat top 109. Alternatively, the body 102 may be provided in the form of a cylinder, a sphere, a triangular prism, a rectangular prism, or other three-dimensional shapes. The cavity 106 may be disposed in the body 102 and extend at least partially therethrough. In some embodiments, the body 102 may be provided in the form of the sacrificial anode 104. In other embodiments, the body 102 may provide a frame, surface, or other structure via which the sacrificial anode 104 can couple to the device 100 via known methods.

The sacrificial anode 104 may be designed to help prevent the corrosion of other materials in a pool system or a spa system. Like the body 102, the sacrificial anode 104 may be provided in the form of an enclosed structure having a U-shaped curved portion that terminates at the flat top 109. As would be appreciated by those skilled in the art, the sacrificial anode 104 may be provided in other shapes than those described herein. When the sacrificial anode 104 is in a "use" state (i.e., when the sacrificial anode 104 has not been depleted), the sacrificial anode 104 may render the device 100 substantially waterproof such that water will not enter the device 100. In comparison, when the sacrificial anode 104 is in a "worn away" or depleted state, water may enter the device 100 and be detected by the sensor 108.

The sacrificial anode 104 may be provided in the form of a metallic component comprising at least one metal. The at least one metal may be provided as any metal with a more negative electrochemical potential than the metals used to construct the other components of the pool and spa. For example, if the sacrificial anode 104 is designed to protect a copper heat exchanger, the sacrificial anode 104 may be composed of any metal with a more negative electrochemical potential than copper. As a non-limiting example, the sacrificial anode 104 may be composed of magnesium, aluminum, zinc, iron, tungsten, nickel, combinations thereof, or alloys thereof. Preferably, the sacrificial anode 104 comprises zinc.

In some embodiments, the sacrificial anode 104 may be removably coupled to the device 100. For example, the sacrificial anode 104 may couple to the body 102. In such embodiments, before the device 100 is used, the sacrificial anode may be coupled to the device 100. Then, when the user wishes to replace the sacrificial anode 104, the user may remove the sacrificial anode 104 from the device 100 and couple a replacement sacrificial anode 104 to the device 100. In other embodiments, the device 100 may be provided in the form of a single-use device wherein the sacrificial anode 104 is not removably coupled to the device 100. In such an embodiment, after the sacrificial anode 104 is depleted, the user may replace the entire device 100.

Referring still to FIG. 1, the cavity 106 may be substantially isolated from an outside environment by the body 102 and/or the sacrificial anode 104. When the cavity 106 is substantially isolated from the outside environment, water may not enter the cavity 106. For example, the cavity 106 may be substantially or entirely surrounded by the sacrificial anode 104 when the sacrificial anode 104 is in use to substantially isolate the sacrificial anode 104 from the outside environment. The cavity 106 may be provided in the form of a shape that substantially mirrors the shape of the sacrificial anode 104. For example, the cavity 106 may be provided in the form of a U-shaped opening in the body 102 of the device 100. In other embodiments, including in embodiments wherein the sacrificial anode 104 is provided in another shape, the cavity 106 may be otherwise shaped (e.g., spherically shaped).

In the use state, the sacrificial anode 104 may surround the cavity 106 by a distance "D." The distance D may be measured in a variety of manners and may be dependent on the shape of the cavity 106 and/or the sacrificial anode 104. In some embodiments, the distance D can be determined by measuring the thickness of the sacrificial anode 104 that surrounds the cavity 106. In embodiments wherein the thickness of the sacrificial anode 104 is not uniform, the distance D can be determined by measuring the thickness of the sacrificial anode 104 at a thinnest portion of the sacrificial anode 104. In some embodiments, the distance D may be determined by measuring the distance from the cavity 106 to the water in which the device 100 is inserted. For example, in such embodiments, the thickness D may be determined by the minimum distance that exists between the outermost boundary of the cavity 106 and the water surrounding the device 100.

When the sacrificial anode 104 is in the use state, the distance D may be any value greater than about 0 mm. In turn, when the distance D is greater than about 0 mm, water from the outside environment may be prevented from entering the cavity 106. Over time, as the device 100 is in use, the sacrificial anode 104 may be worn away or depleted, thereby reducing the value of the distance D. Once the distance D reaches about 0 mm, the sacrificial anode 104 is in the depleted state, and water from the surrounding environment may enter the cavity 106. When the sacrificial anode 104 is in the depleted state, the sacrificial anode 104 and/or the device 100 needs replacement.

Referring still to FIG. 1, the sensor 108 may be provided within or coupled to the cavity 106. Generally, the sensor 108 may detect when water enters the cavity 106, thereby detecting when the sacrificial anode 104 is depleted and needs replacement. The sensor 108 may be provided with a first portion 110A and a second portion 110B. In some embodiments, such as the illustrated embodiment, the portions 110A, 110B are positioned parallel to each other, extend partially into the cavity 106, and are separated by a gap G. Further, the portions 110A,110B may be oriented substantially vertically and perpendicular to the flat top 109 of the body 102. In alternative embodiments, the portions 110A, 110B can also be positioned substantially horizontally with respect to the flat top 109. In yet other embodiments, the portions 110A, 110B may be positioned in other orientations that allow the sensor 108 to determine when the water has breached the cavity 106, as described herein.

The sensor 108 may be provided in various forms such that the sensor 108 can detect when the cavity 106 is breached by the water. In some embodiments, the sensor 108 may be provided in the form of an electrode. In such embodiments, the portions 110A, 110B may be electrode plates composed of a conductive material. A voltage may be applied across the portions 110A, 110B such that, when water enters the cavity 106, an electrical current may be transmitted across the gap G and detected by the sensor 108. Thus, the transmission of the electrical current across the gap G may provide a signal that the sacrificial anode 104 needs replacement.

In other embodiments, the sensor 108 may be provided in the form of a wear sensor. In such embodiments, the portions 110A, 110B may be provided in the form of components that will change states when contacted by water (e.g., the portions 110A, 110B may undergo a resistivity change, which can be measured by the sensor 108).

Figure 2:
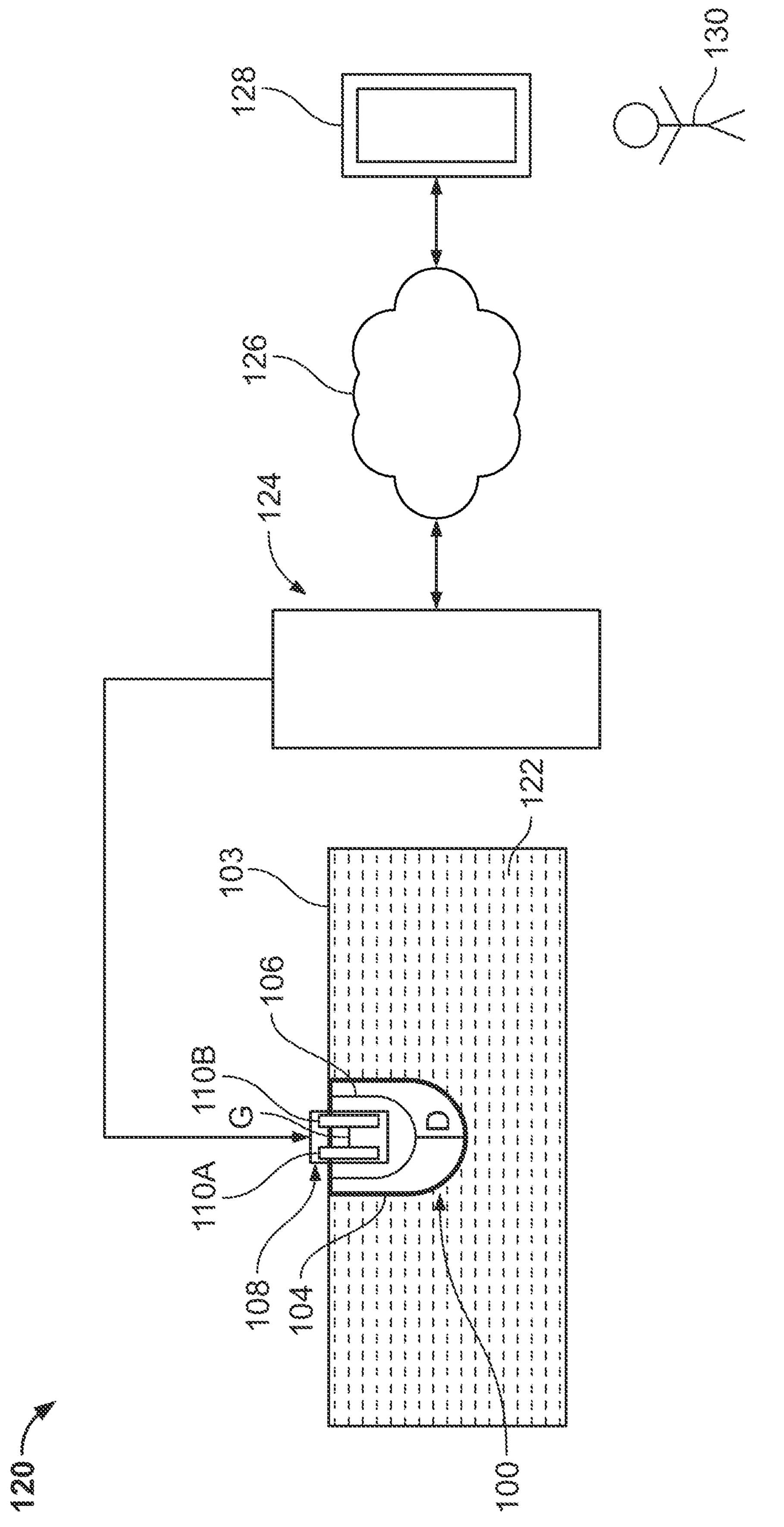
FIG. 2 schematically illustrates a system utilizing the device of FIG. 1, wherein the sacrificial anode is in a first, normal operating state.

In some embodiments, the sensor 108 may include a communication means (not illustrated) that may allow the sensor 108 to communicate with another device, such as a pool automation system 124 (see FIG. 2). The sensor 108 may communicate with the other device via a wired connection or a wireless connection. The sensor 108 may use the communication means to transmit information related to the state of the sacrificial anode 104. For example, the sensor 108 may, via the communication means, communicate with the other device when the sensor 108 measures a first value indicating that the sacrificial anode 104 is in the use condition. In addition, the sensor 108 may communicate with the other device when the sensor 108 measures a second value indicating that the sacrificial anode 104 is in the depleted state. In alternative embodiments, the communication means is coupled to the device 100 and is in communication with the sensor 108.

The sensor 108 may be designed to measure at least one parameter related to the portions 110A, 110B. In some embodiments, the sensor 108 is provided in the form of a meter capable of measuring electrical values associated with the portions 110A, 110B. For example, the sensor 108 may be provided in the form of an ammeter, a voltmeter, an ohmmeter, or a combination thereof. As an additional example, the sensor 108 may be provided in the form of a magnetometer capable of measuring the strength of a magnetic field associated with the portions 110A, 110B. In other embodiments, the sensor 108 may be provided in the form of a component that indicates an "on/off" state. For example, the sensor 108 may be provided as a circuit that is activated when a predetermined current flows across the gap G between the portions 110A, 110B.

When the sacrificial anode 104 is in the use state, the gap G between the portions 110A, 110B may be filled with air, or the gap G may be provided in the form of a vacuum. Preferably, in the use state, there is no electrical communication between the portions 110A, 110B of the sacrificial anode 104, and the current flowing between the portions 110A, 110B may be at an about zero value. Alternatively, if there is electrical communication between the portions 110A, 110B, the current flowing between the portions 110A, 110B may be at a first non-zero value. As the device 100 is used, the sacrificial anode 104 may be depleted. After the cavity 106 is breached by the water, the current flowing between the portions 110A, 110B may change to a second value. The change from the first value to the second value may be detected by the sensor 108, which may then provide a signal indicating that the sacrificial anode 104 is in the depleted state (e.g., partially depleted or completely depleted).

Referring now to FIG. 2, the device 100 is provided within an aquatic system such as a pool or spa system 120.

The system 120 includes a pool 103 filled with water 122, the pool automation system 124, a wireless network 126, and a user device 128 viewable by a user 130. The device 100 is in fluid communication with the water 122 of the pool 103.

The pool 103 may be provided in the form of, by way of example, a residential swimming pool, a commercial swimming pool, a freshwater swimming pool, and/or a saltwater swimming pool. In some embodiments, the pool 103 may be provided in the form of a spa or as a combination pool and spa system. The water 122 of the pool 103 may comprise saltwater or fresh water. In addition, the water 122 may be provided with pool chemicals that are used to maintain the water chemistry of the pool. For example, the pool chemicals may be provided in the form of chlorine, bromine, cyanuric acid, oxidizers, pH adjusters, alkalinity adjusters, and the like. Furthermore, the water 122 may comprise various contaminants, including algae, human body oils, and oils from suntan lotions. The combination of pool chemicals and contaminants within the water 122 may create an environment wherein the water 122 can corrode metallic components of the system 120. The device 100, and particularly the sacrificial anode 104 within, is designed to help protect against such corrosion.

Referring still to FIG. 2, the device 100 and/or the sensor 108 may be connected to the pool automation system 124 via a wired network and/or a wireless network. The device 100 and/or the sensor 108 may transmit at least one signal to the pool automation system 124 via the network. For example, the sensor 108 may transmit a first signal of the at least one signal to the pool automation system 124 when there is air within the gap G. The first signal may thereby indicate to the pool automation system 124 that the sacrificial anode 104 is in the use state and does not need replacement. In comparison, when water breaches the cavity 106, a second signal of the at least one signal may be provided to the pool automation system. Thus, the second signal may indicate to the pool automation system 124 that the sacrificial anode 104 is in the depleted state and needs replacement.

The pool automation system 124 may also connect to one or more user devices 128 via the wired or wireless network 126. The pool automation system 124 may transmit and/or receive data from the user devices 128. The user device 128 may be provided in the form of a desktop computer, a laptop computer, a tablet, a smart phone, a cellular phone, and/or other electronic communication devices. Information regarding the status of the sacrificial anode 104 may be transmitted to the user device 128 by the pool automation system 124 in a variety of manners. For example, the information may be transmitted via a text message, a multimedia message, an email notification, an automated phone call, a message provided within a pool automation app, and the like.

Various users 130 may be provided information from the pool automation system 124 by the user device 128. For example, the user 130 may be a residential pool owner, an operator of a commercial pool, a pool serviceperson, a pool salesperson, a pool supply manufacturer, and the like.

As will be explained in more detail with reference to FIG. 4, the pool automation system 124 may be provided in the form of various components or modules that allow the pool automation system 124 to interpret the signals and data provided from the sensor 108 and the user device 128 and to communicate with the sensor 108 and the user device 128.

Figure 3:
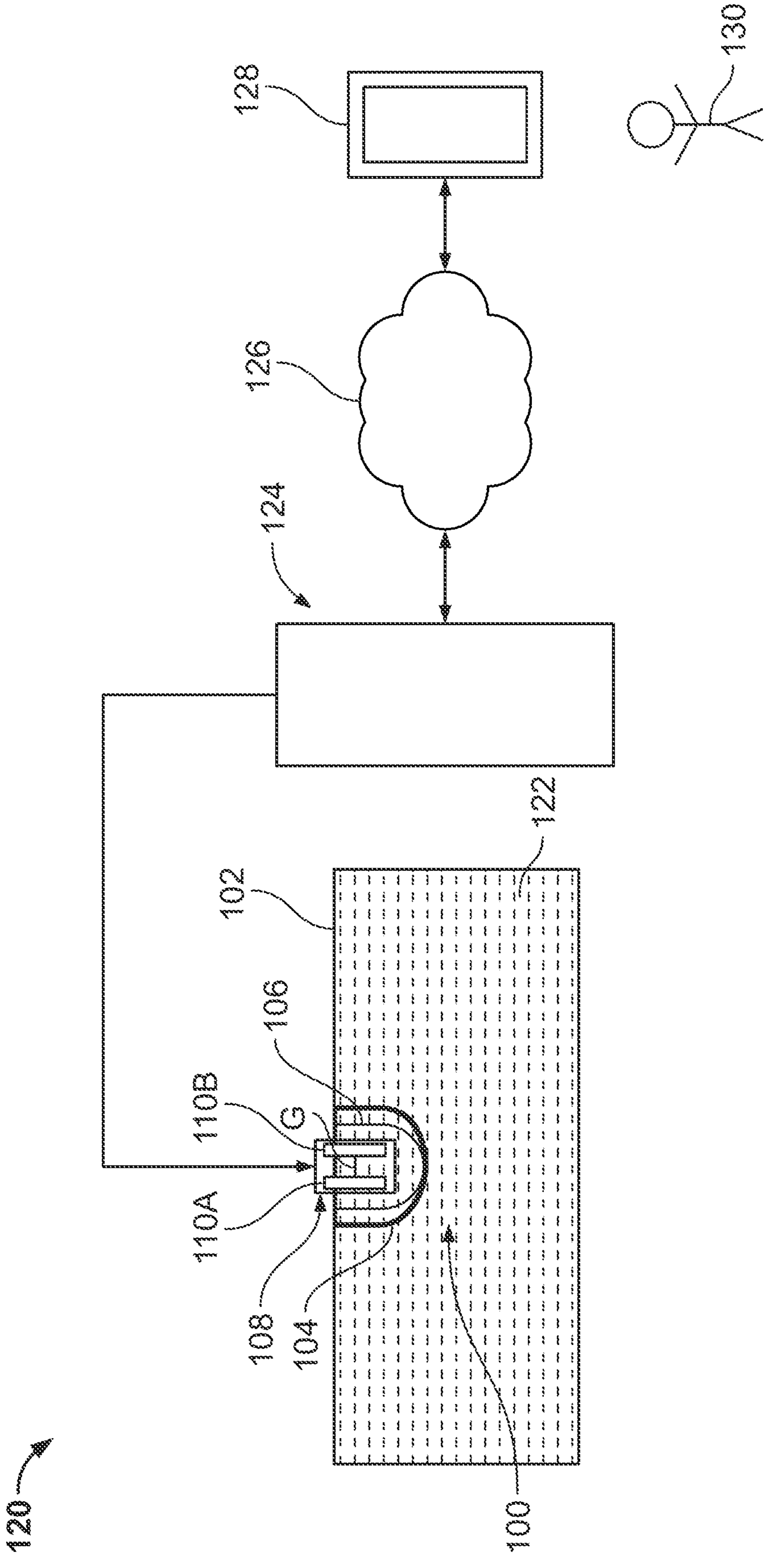
FIG. 3 schematically illustrates the system of FIG. 2, wherein the sacrificial anode is in a second, depleted state.

Turning to FIG. 3, the sacrificial anode 104 is depicted in the depleted state. As time passes while the device 100 is being used, the sacrificial anode 104 is consumed or worn away as it protects other metals in fluid communication with the water 122. In the depleted state, the sacrificial anode 104 no longer fully surrounds the cavity 106 and the distance D has been reduced to about 0 mm. As such, the water 122 of the pool 103 enters the cavity 106. When the water 122 of the pool 103 enters the cavity 106, the gap G between the portions 110A, 110B at least partially fills with the water 122, which is detected by the sensor 108. The sensor 108 may then transmit a signal to the pool automation system 124 indicating that the sacrificial anode 104 is depleted or worn away.

When the pool automation system 124 receives a signal from the sensor 108 indicating that the sacrificial anode 104 is in the depleted state, the pool automation system 124 may transmit a notification to the user device 128 via the network 126. The notification may be sent via a text message, a multimedia message, an email notification, an automated phone call, and/or a message provided within a pool automation app. For example, the notification may be provided in the form of a text alert containing text such as "the sacrificial anode of your device is worn away and needs replacement," or other similar text. As an additional example, the alert may be provided in the form of a graphical icon that indicates that the sacrificial anode 104 is depleted. In some embodiments, the notification may be sent to an application executed at the user device 128. The application may be designed to indicate to the user 130 that the sacrificial anode 104 needs replacement. The application executed at the user device 128 may be provided in the form of an application developed by a manufacturer or a supplier of the device 100.

In some embodiments, the pool automation system 124 may transmit one or more hyperlinks to the user device 128 that are configured to allow the user 130 to buy or purchase a new sacrificial anode 104. The one or more hyperlinks may link to a website of the sacrificial anode 104 manufacturers, and the website may be designed to allow the user 130 to purchase a new sacrificial anode 104. Alternatively, the one or more hyperlinks may execute programming that purchases a new sacrificial anode for the user 130 when the user 130 clicks or selects the one or more hyperlinks.

In some embodiments, the pool automation system 124 transmits the notification and the one or more hyperlinks to the user device 128 in the same message. In other embodiments, the pool automation system 124 transmits the notification and the one or more hyperlinks to the user device 128 in different messages.

The pool automation system 124 may be designed to place one or more functions of the pool automation system 124 into a lockout mode until the sacrificial anode 104 is replaced. The lockout mode refers to a mode that disables the one or more functions of the pool automation system 124 until the sacrificial anode 104 is replaced. Thus, the one or more functions of the pool automation system 124 are stopped and/or temporarily disabled by the pool automation system 124 when the pool automation system is in the lockout mode. Such lockout modes, as enabled by the pool automation system 124, may be designed to help protect the various components of the pool 103 from degradation after the sacrificial anode 104 is depleted.

Figure 5:
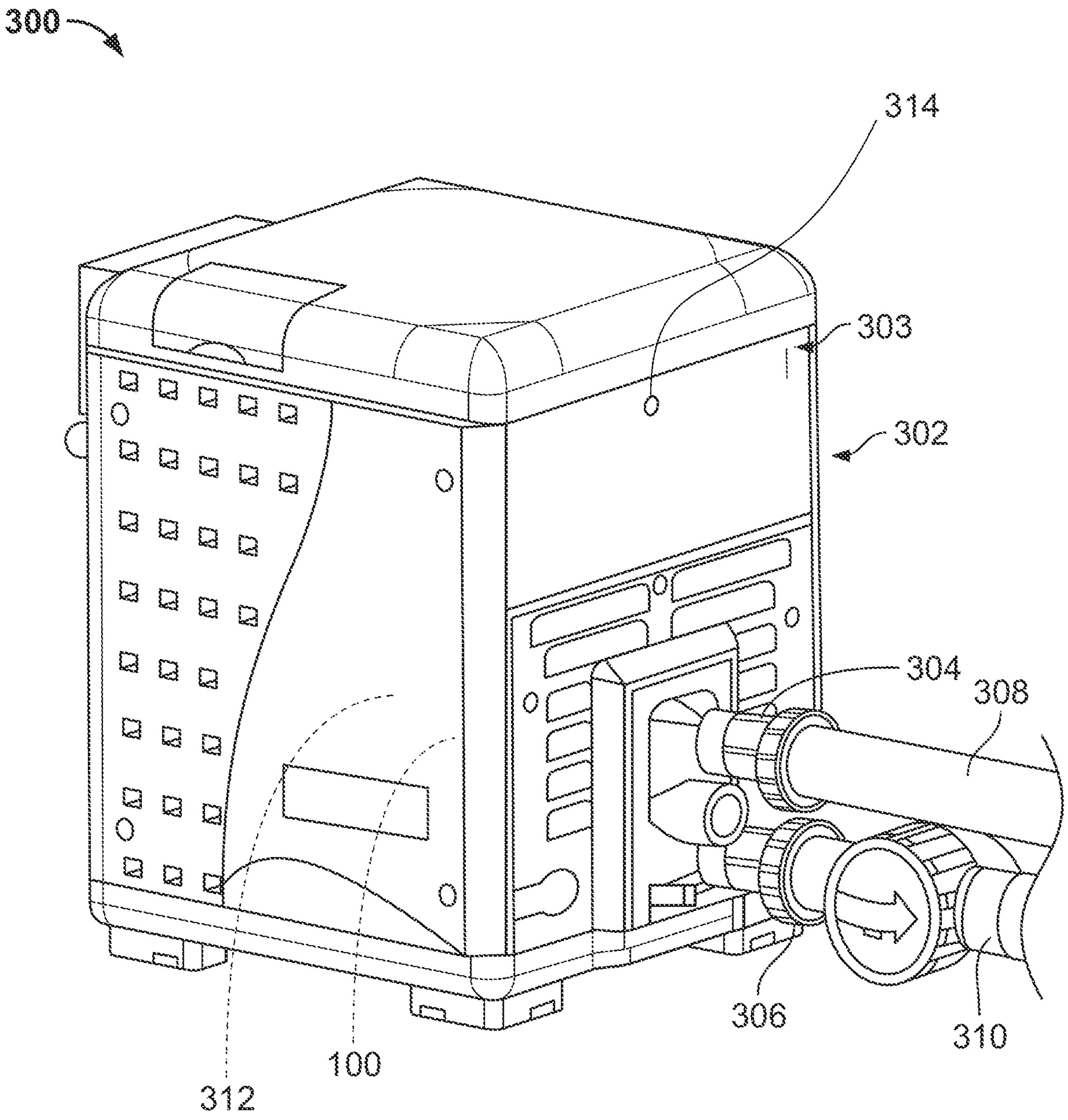
FIG. 5 is an isometric view of an embodiment of a heater provided with the sacrificial anode of FIG. 1.
Figure 6:
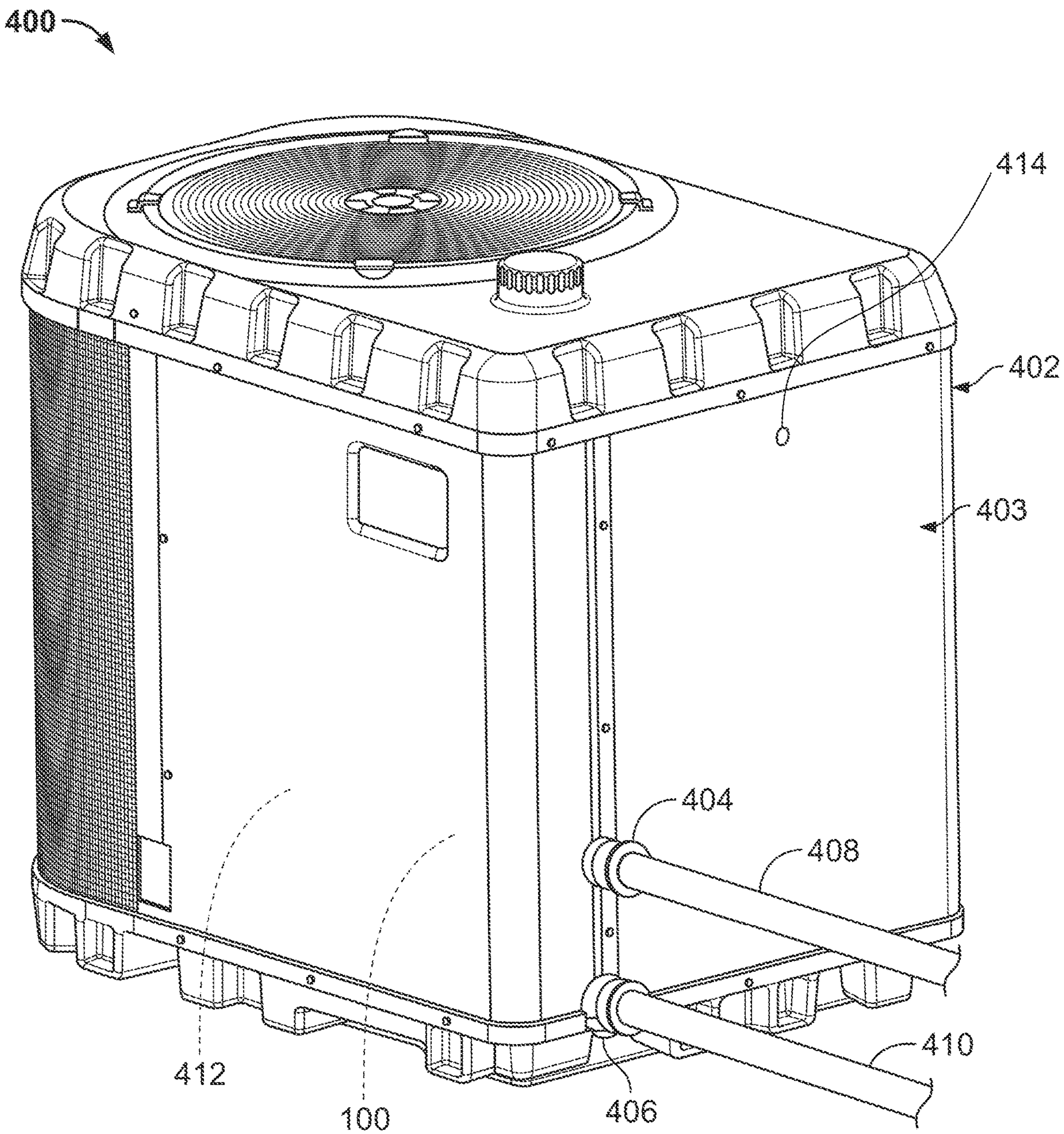
FIG. 6 is an isometric view of another embodiment of a heater provided with the sacrificial anode of FIG. 1.

A first function of the one or more functions of the pool automation system 124 may comprise heating the water 122 of the pool 103 by utilizing a heater (e.g., a heater 300 and/or a heater 400 as provided in FIGS. 5 and 6). Because heat exchangers 312, 412 of the heaters 300, 400 may be composed of copper, a copper alloy, or other metals, the heat exchangers 312, 412 may be vulnerable to degradation or corrosion when the sacrificial anode 104 is depleted. Therefore, the lockout mode of the pool automation system 124 may disable the heaters 300, 400 until the sacrificial anode 104 is replaced to protect the heat exchangers 312, 412. In addition, an alert may be sent to the user device 128 indicating that the heaters 300, 400 have been temporarily disabled until the sacrificial anode 104 is replaced.

In some embodiments, the user 130 may override the lockout mode of the pool automation system 124 to re-enable the one or more functions. In such embodiments, a notification or alert may be provided to the user device 128 warning the user of the risk of damage to components of the pool 103 (e.g., the heat exchangers 312, 412) if the lockout mode is disabled.

After the user 130 deploys a new sacrificial anode in the pool 103, the measured value of the sensor 108 may be reset and/or returned to the first value. For example, the sensor 108 may detect air within the gap G. Once the sensor 108 returns to the first value (e.g., when the air is detected in the gap G), the pool automation system 124 may disable the lockout mode and re-enable one or more functions disabled by the lockout mode (e.g., heating the water 122 of the pool 103).

The pool automation system 124 may be designed to provide a message or an alert to the user containing information about the operational status of the device 100 including, for example, an estimated total lifetime of the sacrificial anode 104, an estimated remaining lifetime of the sacrificial anode 104, and/or the rate of degradation or wear of the sacrificial anode 104. For example, the pool automation system 124 may estimate or determine when the sacrificial anode 104 was first deployed and estimate or determine a time until which the sacrificial anode 104 of the device 100 will be depleted. The time in which the sacrificial anode 104 was first deployed may be manually entered into the pool automation system 124, or automatically detected by the pool automation system 124 (e.g., through plug-and-play type functionality).

By way of example, a process or method by which an estimation of the total or remaining lifetime of the sacrificial anode 104 is provided. For example, a first sacrificial anode 104 may be deployed within the pool 103 and consumed in approximately 12 months, representing a first deployment and use cycle of the sacrificial anode 104. After the sacrificial anode 104 completes the first deployment and replacement cycle, the pool automation system 124 collects and stores the life cycle information such that the life cycle information can be used in a predictive manner. Thus, in this example, the pool automation system 124 may determine that the sacrificial anode 104 needs to be replaced approximately once a year and may provide an alert to the user 130 before the expiration of a second deployment and replacement cycle.

The pool automation system 124 may also use a variety of factors to determine the estimated lifetime of a deployed sacrificial anode 104 besides the deployment cycles of the sacrificial anode 104, including, but not limited to, an elapsed time, the flow rate of the water 122 through the system 120, and one or more water chemistry parameters (e.g., a pH level, a chlorine level, a total alkalinity level, a calcium hardness level, a cyanuric acid concentration, a total dissolved solids concentration, etc.) of the water 122. Specifically, the pool automation system 124 may use this information to estimate the depletion rate of the sacrificial anode 104, and in turn, use the depletion rate to estimate the remaining lifetime of the sacrificial anode 104. In addition, the pool automation system 124 may compile a data log that includes one or more flow rates, one or more chemistry parameters of the water 122, bather load, the temperature of the water 122, and other associated parameters. The pool automation system 124 may also compare a length of the sacrificial anode replacement cycle with other parameters to calibrate the estimated lifetimes for the sacrificial anode 104.

In some embodiments, the device 100 may be designed to estimate the remaining lifetime of the deployed sacrificial anode 104. In such embodiments, the estimate may be provided by the device 100 to the pool automation system 124 and then to the user 130 via the user device 128.

Figure 4:
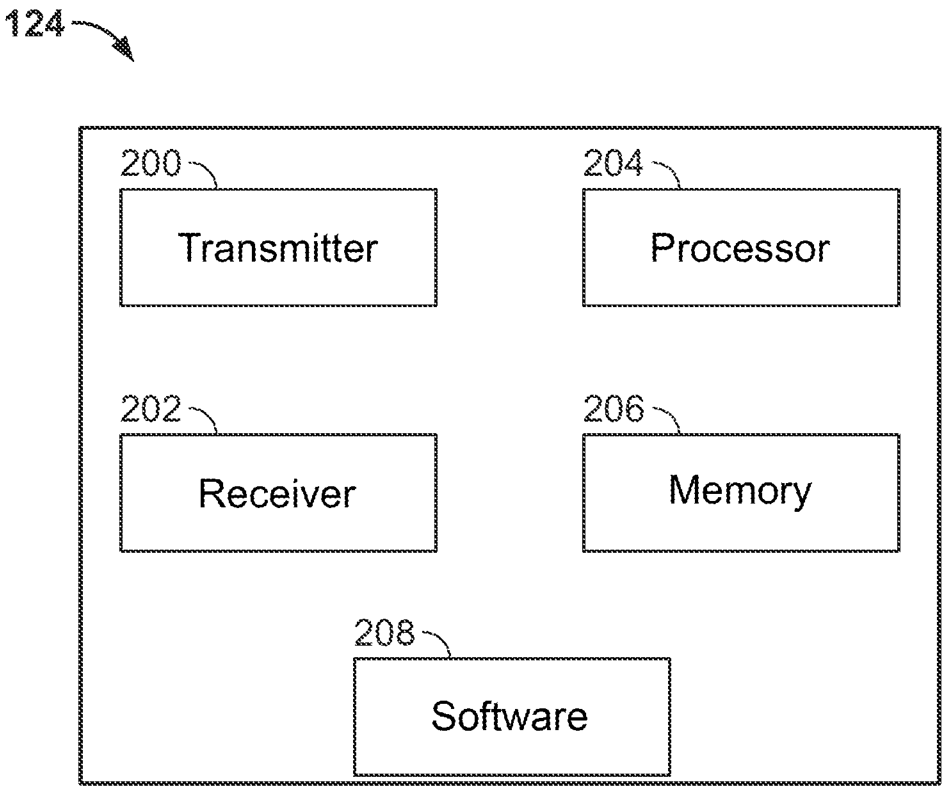
FIG. 4 schematically illustrates a block diagram of an embodiment of a pool automation system for use with the system of FIG. 2.

Referring now to FIG. 4, a block diagram of the pool automation system 124 is shown. The pool automation system 124 is provided in the form of a transmitter 200, a receiver 202, a processor 204, a memory 206, and software 208, which is designed to store and execute methodologies and functions described herein.

The transmitter 200 may be provided in the form of a device that can transmit information from the pool automation system 124 to another device. For example, the transmitter 200 may be adapted to transmit information from the pool automation system 124 to the device 100, the sensor 108, and/or the user device 128. In addition, the transmitter 200 may be provided as a wired transmitter or a wireless transmitter. In some embodiments, the transmitter 200 may be configured to transmit signals or information to other components of the system 120, such as the heaters 300, 400.

The receiver 202 may be provided in the form of a device that can receive signals, data, and/or information from another device. For example, the receiver 202 may be adapted to receive at least one signal from the device 100, the sensor 108, and/or the user device 128. As described herein, the at least one signal may indicate the status of the sacrificial anode 104 (e.g., when the sacrificial anode 104 is depleted). In addition, the receiver 202 may be in communication with the device 100, the sensor 108, and/or the user device 128 via a wired or wireless connection. In some embodiments, the receiver 202 may also be adapted to receive information from other devices coupled to the pool automation system 124, such as the heaters 300, 400.

Referring still to FIG. 4, the processor 204 may be designed to analyze at least one signal received from the device 100 and/or the sensor 108. The processor 204 may execute programming included within the software 208 that will perform an analysis of the data received from the device 100 and/or the sensor 108. After analyzing the at least one signal, the processor 204 may determine whether a notification should be transmitted to the user device 128 or another component coupled to the pool automation system 124. For example, the processor 204 may transmit a notification to the user device 128 if a signal provided by the sensor 108 indicates that water is present in the cavity 106 of the device 100. As an additional example, the processor 204 may determine not to transmit a notification if a signal provided by the sensor 108 that air is present in the cavity 106 of the device 100. As yet another example, when the sensor 108 measures a first value that is associated with the sacrificial anode 104 being in the use state, the processor 204 may transmit information indicating that the sacrificial anode 104 does not need replacement.

The processor 204 may be designed to execute programming included in the software 208 that will allow the pool automation system 124 to estimate the total lifetime and remaining lifetime of the sacrificial anode 104, in accordance with the teachings described herein. Further, the processor 204 may be designed to execute programming included in the software 208 that allows the processor 204 to estimate or determine the wear rate of the sacrificial anode 104.

When the processor 204 determines a notification should be transmitted to the user device 128, the processor 204 may communicate with the transmitter 200. The processor 204 may communicate information to the transmitter 200 such that an alert or a message can be provided to the user 130. Further, the transmitter 200 may also transmit one or more hyperlinks to the user device 128 when the processor 204 determines that a new sacrificial anode 104 is required.

The processor 204 is further adapted to transmit signals, via the transmitter 200, which can place one or more functions of the pool automation system 124 into a lockout mode until the sacrificial anode 104 is replaced, as explained with reference to FIGS. 2 and 3.

In some embodiments, the processor 204 refers to a single-core processor, a dual-core processor, a quad-core processor, a hexacore processor, an octacore processor, a decacore processor, any multi-core processor, and/or any such processor that is known to a person skilled in the art.

The memory 206 may contain the software 208 that is designed to be executed by the processor 204. In addition, as explained with reference to FIG. 3, the memory 206 may store information related to parameters associated with the use of the device 100 and/or parameters related to the characteristics of the swimming pool 103. The memory 206 may provide this information as input to the processor 204 such that the processor 204 can estimate the total lifetime, the remaining lifetime, and/or the wear rate of the sacrificial anode. In some embodiments, the memory 206 may be adapted to store information related to the characteristics of other devices coupled to or in communication with the pool automation system 124.

In some embodiments, the memory 206 is provided in the form of a read access memory (RAM), a read-only memory (ROM), a flash memory, a hard disk memory, and/or any such memory that is known to a person skilled in the art.

Referring now to FIG. 5, the heater 300 is provided in the form of a housing 302, a body 303, an inlet 304, an outlet 306, and the heat exchanger 312. The inlet 304 and the outlet 306 are coupled to an inlet conduit 308 and an outlet conduit 310, respectively. Further, the device 100 may be coupled to the heater 300 and provided therein.

The body 303 of the housing 302 may be provided with a profile including rounded edges that substantially covers the components retained within the heater 300. The body 303 may also be provided in other shapes and forms, (e.g., in the form of a rectangular prism) as would be appreciated by those skilled in the art. In some embodiments, the body 303 may be composed of a durable material (e.g., metal or plastic) that is adapted to withstand environmental conditions in an outside environment.

Generally, the inlet 304 and the outlet 306 may be in fluid communication with a pool system, a spa system, or a combination pool-spa system via the inlet conduit 308 and the outlet conduit 310. For example, the inlet 304 and the outlet 306 may be in fluid communication with the system 120 provided in FIGS. 2 and 3. More specifically, the inlet 304 and/or the outlet 306 may be in fluid communication with a pool, a spa, a pump, a filter, a chlorinator, chemical feeders, valves, sensors, drains, and other pool and spa system components that are known in the art. In turn, the components of the heater 300, including the heat exchanger 312, are in fluid communication with the water from the pool or the spa.

As described herein, because the heater 300 may be provided water from a pool or a spa, components of the heater 300 may be susceptible to corrosion. For example, the copper components of the heat exchanger 312 may be degraded by the pool water over time. However, because the heater 300 is coupled to the device 100 which includes the sacrificial anode 104, the heat exchanger 312 may be protected from corrosion.

Referring still to FIG. 5, the device 100 is coupled to a conduit (not illustrated) that is in fluid communication with the heat exchanger 312. In other embodiments, the device 100 may be coupled to the heat exchanger 312 directly. In yet other embodiments, the device 100 may be coupled to the inlet 304, the outlet 306, the inlet conduit 308, the outlet conduit 310, or any other conduit that is in fluid communication with the heat exchanger 312. Preferably, the device 100 is coupled to a conduit provided immediately before the heat exchanger 312 or is directly coupled to a component of the heat exchanger.

Optionally, the heater 300 may be provided with an indicator light 314. The indicator light 314 may be provided in the form of an incandescent light, a compact fluorescent light, an LED light, and/or other lights that are known in the art. In the illustrated embodiment, the indicator light is coupled to the body 303 of the heater 300, although the indicator light 314 may be positioned and located elsewhere on the heater (e.g., on a control board of the heater). The indicator light 314 may be used to communicate information regarding the status of the heater 300 to the user 130. For example, the indicator light 314 may be used to indicate when the heater 300 is operating in a normal condition. As an additional example, the indicator light 314 may indicate when the heater 300 has been disabled by the pool automation system 124, such as when the sacrificial anode 104 is in the depleted state. As yet another example, the indicator light 314 may be used to indicate that the sacrificial anode 104 is in the depleted state.

The indicator light 314 may communicate the status information in a variety of manners. In some embodiments, the indicator light 314 may toggle between an on state and an off state when the status of the heater 300 and/or the device 100 changes. In other embodiments, such as when the indicator light 314 is provided in the form of an LED light, the indicator light 314 may change colors to indicate the status of the heater 300 and/or the device 100. For example, the indicator light 314 may be green when the heater 300 is in the normal use condition and may be yellow when the pool automation system 124 has disabled the operation of the heater. As an additional example, the indicator light 314 may be green when the sacrificial anode 104 is in the use condition and red when the sacrificial anode 104 is in the depleted condition. As yet another example, the indicator light 314 may be green when at least about 40% of the estimated lifetime of the sacrificial anode 104 is remaining, yellow when between about 25% and about 40% of the estimated lifetime of the sacrificial anode 104 is remaining, orange when between about 0% and about 25% of the estimated lifetime of the sacrificial anode 104 is remaining, and red when the sacrificial anode is in the depleted state. While limited examples of the use of the indicator light 314 have been provided, other uses for the indicator light 314 may be provided.

In some embodiments, the heater 300 may be provided in the form of the MasterTemp® High Performance Pool and Spa Heater, provided by Pentair, Inc. and described in U.S. patent application Ser. No. 17/650,611, the contents of which are incorporated by reference in its entirety.

Turning to FIG. 6, the heater 400 is provided. The heater 400 may have a substantially similar function and operation as the heater 300. The heater 400 may be provided in the form of a housing 402, a body 403, an inlet 404, an outlet 406, and the heat exchanger 412 that are coupled to an inlet conduit 408, an outlet conduit 410, and the device 100, wherein each of the aforementioned components have substantially the same function and configuration as the similarly named components described with reference to FIG. 5. Unlike the heater 300, the heat exchanger 412 of the heater 400 may be provided as a hybrid gas-electric heat exchanger; specifically, the heater 400 may be provided in the form of the UltraTemp ETi® Hybrid Heater provided by Pentair, Inc. and described in U.S. Pat. Nos. 9,732,536, 10,400,466, 11,142,923, and U.S. patent application Ser. No. 17/450,614, the contents of which are incorporated by reference in their entirety.

Methods for using a device containing a sacrificial anode, such as the device 100 described herein, are provided. The methods may utilize any embodiment of the device 100 that is consistent with the teachings recited herein.

Figure 7:
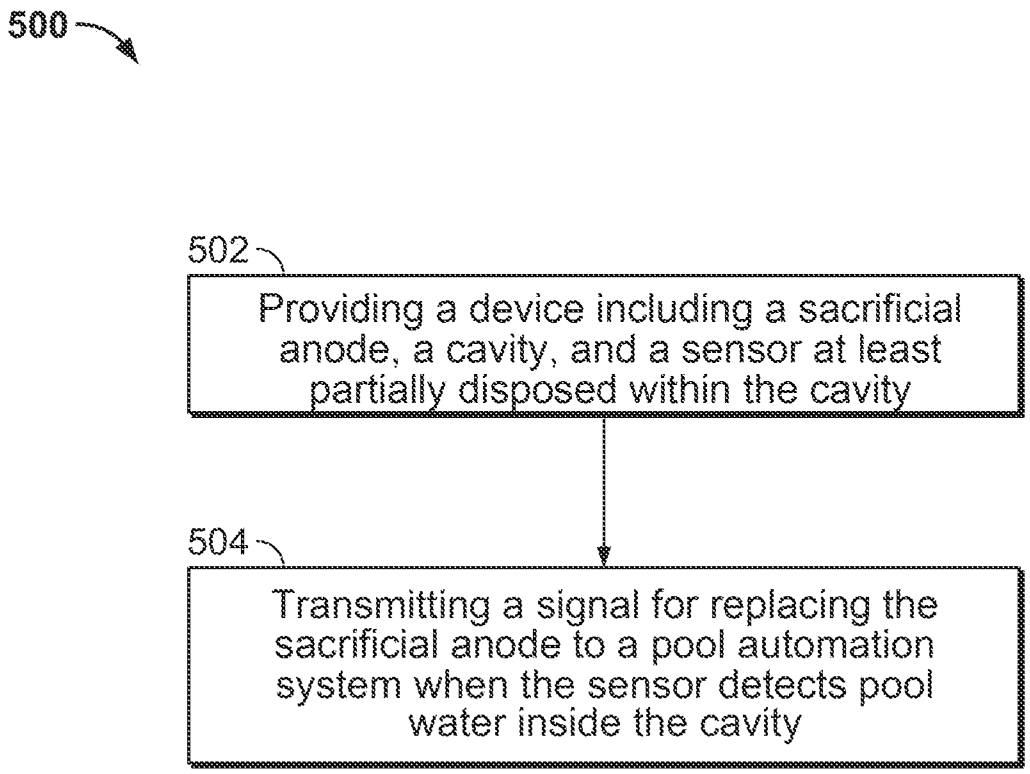
FIG. 7 schematically illustrates a method for notifying a user to replace a sacrificial anode.

Referring now to FIG. 7, a method 500 for notifying a user to replace the sacrificial anode 104 of the device 100 is illustrated. The method 500 includes a step 502 of providing a device including a sacrificial anode, a cavity, and a sensor at least partially disposed within the cavity. The method 500 also includes a step 504 of transmitting a signal for replacing the sacrificial anode to a pool automation system when the sensor detects water inside the cavity. In some embodiments, the sensor detects the water inside the cavity when a gap G between a first portion and a second portion of the sensor is at least partially filled with water. Optionally, the method also includes a step of transmitting a notification to a user device, wherein the notification includes information regarding the status of the sacrificial anode. Optionally, the status of the sacrificial anode may be operational information stating that the sacrificial anode is in the use state and/or that the sacrificial anode is depleted. In some embodiments, the pool automation system may transmit at least one hyperlink to the user. The at least one hyperlink may allow the user to purchase a replacement sacrificial anode. In some embodiments, the notification may be provided in the form of a text message, a multimedia message, an email notification, an automated phone call, and/or a message provided within a pool automation app. Optionally, the method may further include the step of the pool automation system entering into a lockout mode, wherein the lockout mode disables at least one function of at least one component coupled to the pool automation system. In such embodiments of the method 500, the at least one component is provided in the form of a pool heater, wherein in the lockout mode the pool heater can no longer heat the water of a pool or spa. In some embodiments, the method may include the step of coupling the sacrificial anode to a pool heater.

In some embodiments, the device provided in the method 500 may include any of the components of the device 100 described herein. In other embodiments, the water may enter the device when the distance D between the sacrificial anode and the gap G is reduced to about 0 mm. In some embodiments, the sensor provided in the step 504 may comprise any of the sensors 108 described herein. In some embodiments, the pool automation system provided in step 504 may include any of the components of the pool automation system 124 described herein.

The method 500 may further comprise additional steps consistent with the teachings disclosed herein. In addition, the method 500 may also comprise fewer steps than those described above.

The present disclosure offers the following technical advantages over existing solutions: (a) timely notifying a user to replace a sacrificial anode in a depleted state with a new sacrificial anode; (b) disabling at least one function of a pool automation system (e.g., the heating of pool water by a pool heater) to protect the components of a pool or a spa from corrosion; (c) helping the user purchase a new sacrificial anode; and (d) estimating the total lifetime, the remaining lifetime, and the wear rate of the sacrificial anode.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

The invention claimed is:

1. A sacrificial anode device, comprising:
- a body defining a cavity that extends partially through the body;
- a sacrificial anode couplable to the body, wherein the sacrificial anode surrounds and seals the cavity when coupled to the body; and
- a sensor at least partially received within the cavity, the sensor in communication with a pool automation system and designed to transmit a signal to the pool automation system when water is detected inside the cavity.

2. The device of claim 1, wherein the device is substantially waterproof when the sacrificial anode is in the use state, and wherein water can enter the cavity of the device when the sacrificial anode is substantially depleted.

3. The device of claim 1, the sensor further comprising a first portion and a second portion that are positioned substantially parallel to each other and separated by a gap.

4. The device of claim 3, wherein the sensor transmits the signal when the gap is at least partially filled with water.

5. The device of claim 1, wherein the pool automation system transmits a notification to a user device after receiving the signal from the sensor.

6. The device of claim 1, wherein the pool automation system sets one or more functions of the pool automation system into a lockout mode when the sacrificial anode is depleted.

7. The device of claim 6, wherein a first function of the one or more functions of the pool automation system comprises operating a pool heater coupled to a pool, and wherein an alert is provided to a user to notify the user that the first function is disabled.

8. A sacrificial anode system, comprising:
- a device including:
  - a sacrificial anode coupled to a body of the device, wherein a cavity is provided between the body and the sacrificial anode and wherein the sacrificial anode substantially surrounds the cavity;
  - a sensor in communication with the cavity, the sensor designed to transmit a first signal to a pool automation system when the sacrificial anode is depleted;

the pool automation system including:

a receiver designed to receive the first signal from the sensor; and a transmitter designed to transmit a notification to a user device after receiving the first signal from the sensor.

9. The system of claim 8, wherein the sensor is designed to transmit a second signal to the pool automation system when the sacrificial anode is in the use condition.

10. The system of claim 8, the pool automation system further including:

a processor designed to execute software; and a memory designed to retain the software and data related to the use of the sacrificial anode, wherein the processor can use the data to determine a remaining lifetime of the sacrificial anode.

11. The system of claim 10, wherein the pool automation system transmits the notification to the user device when the first signal is received by the pool automation system or when the remaining lifetime of the sacrificial anode is at or below a predetermined threshold.

12. The system of claim 8, wherein the device is coupled to a heater of a pool or a spa.

13. The system of claim 8, wherein the pool automation system determines a wear rate of the sacrificial anode based on an operational parameter of a pool or the sacrificial anode including at least one of an elapsed time, a flow rate, or one or more chemistry parameters of the pool.

14. The system of claim 8, wherein the sensor is provided with at least two electrode plates that are designed to detect when water from a pool enters the cavity of the device.

15. A method for determining a status of a sacrificial anode, the method comprising:

providing a device including the sacrificial anode, a cavity within the device, and a sensor at least partially disposed within the cavity;

activating the sensor when water enters the cavity of the device;

transmitting a signal from the sensor to a pool automation system; and transmitting a notification to a user device, wherein the notification includes information regarding the status of the sacrificial anode.

16. The method of claim 15, wherein the status of the sacrificial anode indicates that the sacrificial anode is in the use state or that the sacrificial anode is depleted.

17. The method of claim 15, wherein the notification is provided as one of a text message, a multimedia message, an email notification, an automated phone call, and/or a message provided within a pool automation application.

18. The method of claim 15, wherein the pool automation system enters into a lockout mode when the signal from the sensor indicates that the sacrificial anode is depleted.

19. The method of claim 18, wherein the lockout mode disables at least one function of at least one component coupled to the pool automation system.

20. The method of claim 15, wherein water enters the cavity of the device when a gap between the sacrificial anode and the cavity reaches a value of about 0 mm.

* * * * *